US012720006B2

(12) United States Patent
Shim et al.

(10) Patent No.: US 12,720,006 B2
(45) Date of Patent: Aug. 25, 2026

(54) DISPLAY DEVICE, REMOTE CONTROL DEVICE AND DISPLAY SYSTEM

(71) Applicant: LG ELECTRONICS INC., Seoul (KR)

(72) Inventors: Hwasuk Shim, Seoul (KR); Changho Choi, Seoul (KR); Hyejin Kim, Seoul (KR); Hyekyoung Bu, Seoul (KR); Minkyu Oh, Seoul (KR); Sunggul Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/992,501

(22) PCT Filed: Jul. 26, 2022

(86) PCT No.: PCT/KR2022/010953
§ 371 (c)(1),
(2) Date: Jan. 8, 2025

(87) PCT Pub. No.: WO2024/024996
PCT Pub. Date: Feb. 1, 2024

(65) Prior Publication Data
US 2026/0012553 A1 Jan. 8, 2026

(51) Int. Cl.
*H04N 5/64* (2006.01)
*H04N 21/422* (2011.01)

(52) U.S. Cl.
CPC ......... *H04N 5/64* (2013.01); *H04N 21/42222* (2013.01)

(58) Field of Classification Search
CPC ............... H04N 5/64; H04N 21/42222; H04N 21/42202; H04N 21/42203; H04N 21/44218; H04N 21/422; H04N 21/4223; H04N 21/431; G02F 1/1333; G03B 21/58
See application file for complete search history.

(56) References Cited

U.S. PATENT DOCUMENTS 5,799,992 A * 9/1998 Kojima .................... B60J 11/06 293/DIG. 6
9,313,439 B2 4/2016 Lee et al.
2015/0109665 A1 4/2015 Miggiano
2017/0287323 A1* 10/2017 Einaudi ................ G01R 31/382
2019/0037710 A1 1/2019 Han
2019/0208157 A1* 7/2019 Wohlmuth ........... B65H 75/446
2020/0058272 A1 2/2020 Oh et al.
2021/0213831 A1* 7/2021 Kang .................... B60K 35/50
(Continued)

FOREIGN PATENT DOCUMENTS

EP 3 848 219 A1 7/2021
JP 2008-46211 A 2/2008
KR 10-2012-0005313 A 1/2012
(Continued)

*Primary Examiner* — Michael E Teitelbaum
(74) *Attorney, Agent, or Firm* — Birch, Stewart, Kolasch & Birch, LLP

(57) ABSTRACT

A display device according to an embodiment of the present invention comprises: a frame; a display fixed to the frame; a door covering the display; and a sliding module for opening and closing the door, wherein the door can be formed of a plastic sheet and a fabric sheet covering the plastic sheet.

12 Claims, 17 Drawing Sheets

(56) References Cited

U.S. PATENT DOCUMENTS

2024/0003989 A1 * 1/2024 Kim ...................... G01R 33/02

FOREIGN PATENT DOCUMENTS

| | | | |
|---|---|---|---|
| KR | 10-2014-0144029 | A | 12/2014 |
| KR | 10-2021-0004407 | A | 1/2021 |
| KR | 10-2021-0017565 | A | 2/2021 |
| KR | 10-2021-0096484 | A | 8/2021 |

* cited by examiner

DISPLAY DEVICE, REMOTE CONTROL DEVICE AND DISPLAY SYSTEM

CROSS REFERENCE TO RELATED APPLICATION

This application is the National Phase of PCT International Application No. PCT/KR2022/010953, filed on Jul. 26, 2022, which is hereby expressly incorporated by reference into the present application.

TECHNICAL FIELD

The present disclosure relates to a display device, a remote control device, and a display system.

The present disclosure relates to a display device using a sliding door, a remote control device controlling the display device, and a display system including the these.

BACKGROUND ART

As display-related technologies such as slimming of thickness and flexibility develop, when the display device is not in use, it is made to look like a picture frame or the display is placed inside the housing, giving it an interior effect.

In a similar case, a sliding door that opens and closes so that the display is visible only when watching a video and not visible when not watching a video can be applied to the display device. However, existing sliding doors are made of hard materials such as glass or sheet metal, so there is a problem that the volume increases due to the space occupied by the door when it is opened and closed.

In addition, since the door is opened and closed manually, there is an inconvenience in that the user has to open the door themselves to watch the video.

DISCLOSURE

Technical Problem

The object of this present disclosure is to provide a display device that minimizes the volume occupied when the door is opened and closed.

The object of this present disclosure is to provide a display device that applies a door made of fabric material.

The object of this present disclosure is to provide a display device whose door automatically opens and closes.

Technical Solution

A display device according to an embodiment of the present disclosure comprises a frame, a display fixed to the frame, a door covering the display and a sliding module for opening and closing the door, wherein the door is formed of a plastic sheet and a fabric sheet covering the plastic sheet.

The sliding module comprises a motor, a pulley that rotates by driving the motor, a belt that moves by rotation of the pulley, and at least one door fixing bar that is attached to the door and moves linearly along the belt.

The sliding module further comprises a linear motion guide that guides straight-line movement of the door fixing bar.

The door fixing bar comprises a first door fixing bar attached to a first side end of the door, and a second door fixing bar attached to a second side end of the door.

The display device further comprises a wire whose two ends are connected to lower ends of the first door fixing bar and the second door fixing bar, respectively.

The door is formed by a flat part covering the display, and a curved part extending from the flat part and having at least a portion of a curve.

The display device further comprises at least one hall sensor installed in the frame.

The display is configured to output different videos depending on a size of the magnetic field detected by the hall sensor.

The display device further comprises a magnetic plate that is detachable and recognized by the hall sensor.

The door is configured to open or close automatically depending on whether a user is in front of the door or not.

The door is fully or partially open depending on a distance from the user.

The display is configured to output video in one area according to an open length of the door.

The frame comprises a main frame on which the display and the sliding module are mounted, an upper cover covering an upper portion of the main frame, and a stand supporting the main frame.

A display system including a display device and a remote control device that transmits a wireless signal to the display device, wherein the display device comprises a frame, a display fixed to the frame, a door covering the display, and a sliding module for opening and closing the door, and the door is formed of a plastic sheet and a fabric sheet covering the plastic sheet.

The remote control device comprises at least one hall sensor.

Advantageous Effects

According to an embodiment of the present disclosure, since a door made of fabric material is provided in the display device, there is an advantage of improving the external design.

According to an embodiment of the present disclosure, since the door is placed at the rear of the device when it is opened, there is an advantage of minimizing the problem of the volume increasing due to the opening and closing of the door.

According to an embodiment of the present disclosure, since the door is stably opened and closed through a sliding module, there is an advantage of improving the stability and reliability of the operation.

According to an embodiment of the present disclosure, since the door is automatically opened and closed according to sensing information of the hall sensor, the presence of the user, the distance from the user, etc., there is an advantage of improving the user convenience.

DESCRIPTION OF DRAWINGS

FIG. 3 shows an example of an actual configuration of a remote control device 200 according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
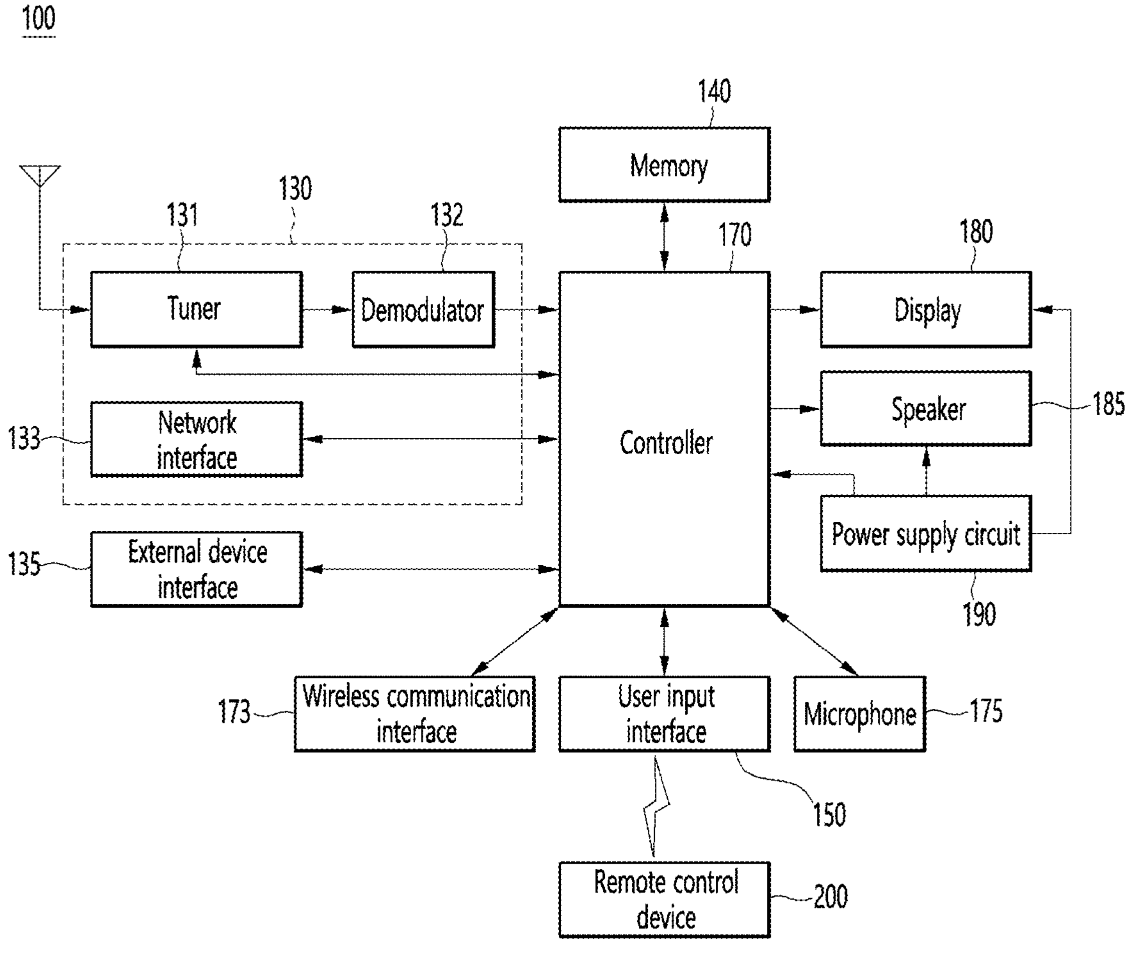
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a microphone 175, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The microphone 175 can acquire audio. The microphone 175 can acquire and recognize voices around the display device 100.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

The speaker 185 receives a signal processed by the controller 170 and outputs it as voice.

The power supply circuit 190 supplies the corresponding power to the display device 100 as a whole. In particular, the power supply circuit 190 can supply power to a controller 170 that can be implemented in the form of a system on chip (SOC), a display 180 for displaying videos, and a speaker 185 for outputting audio.

Specifically, the power supply circuit 190 can be equipped with a converter that converts AC power into DC power, and a dc/dc converter that converts the level of the DC power.

Next, a remote control device according to an embodiment of the present disclosure will be described with reference to FIGS. 2 to 3.

Figure 2:
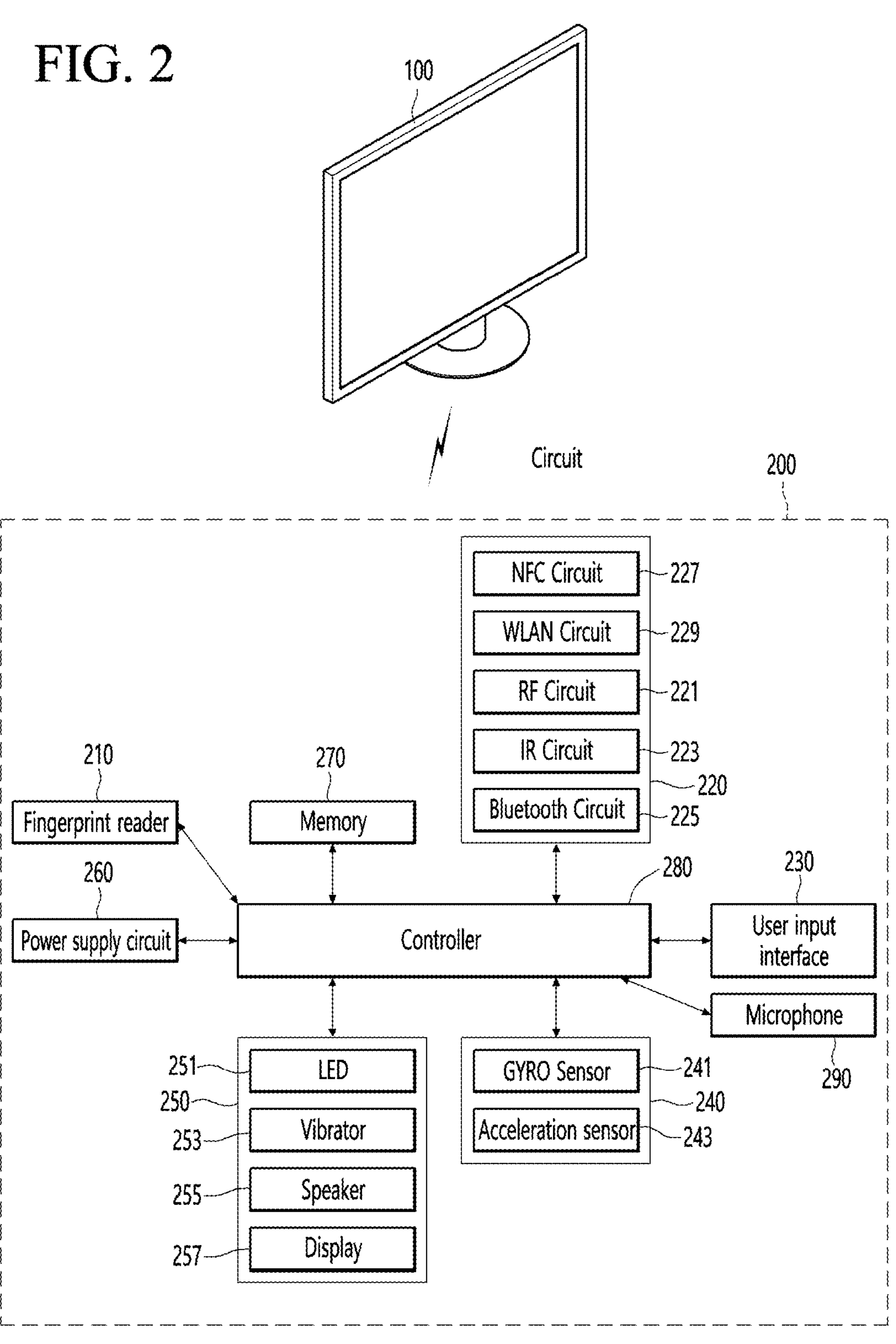
FIG. 2 is a block diagram of a remote control device according to an embodiment of the present disclosure.
Figure 3:
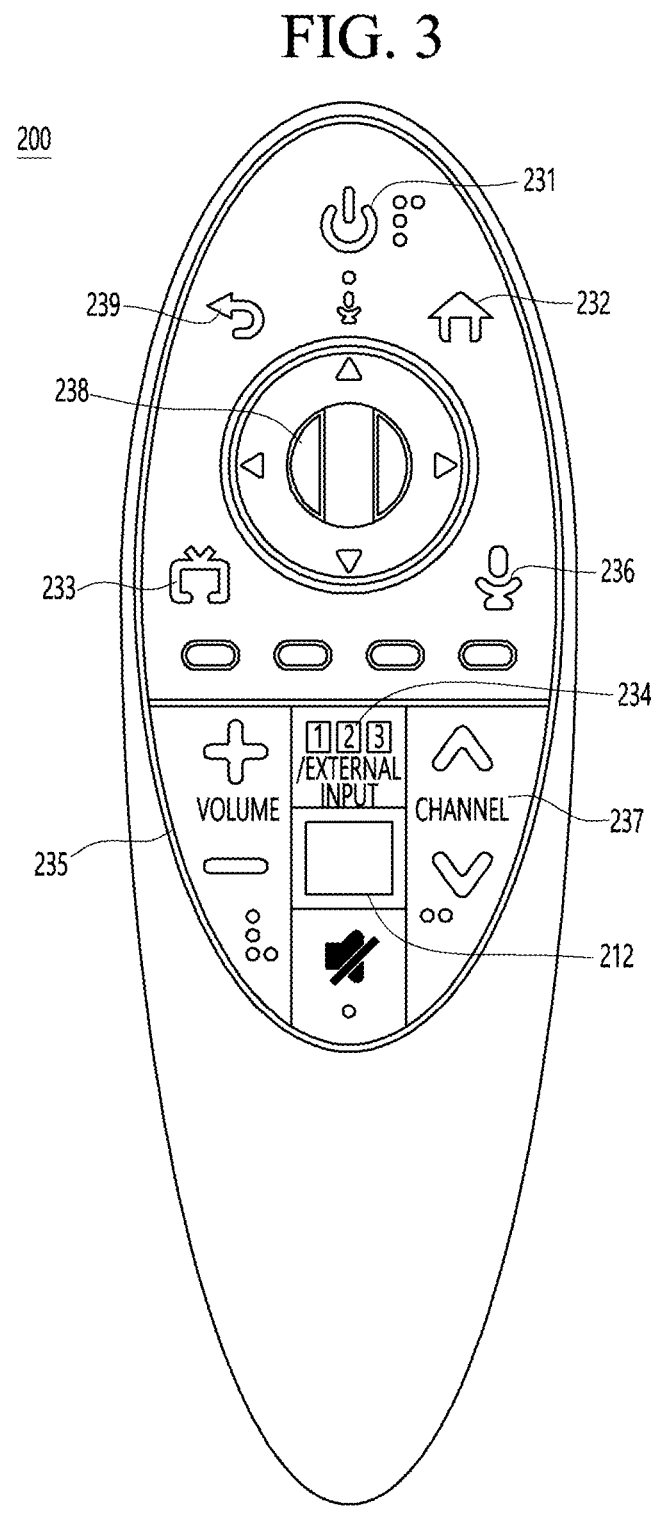

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen. A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
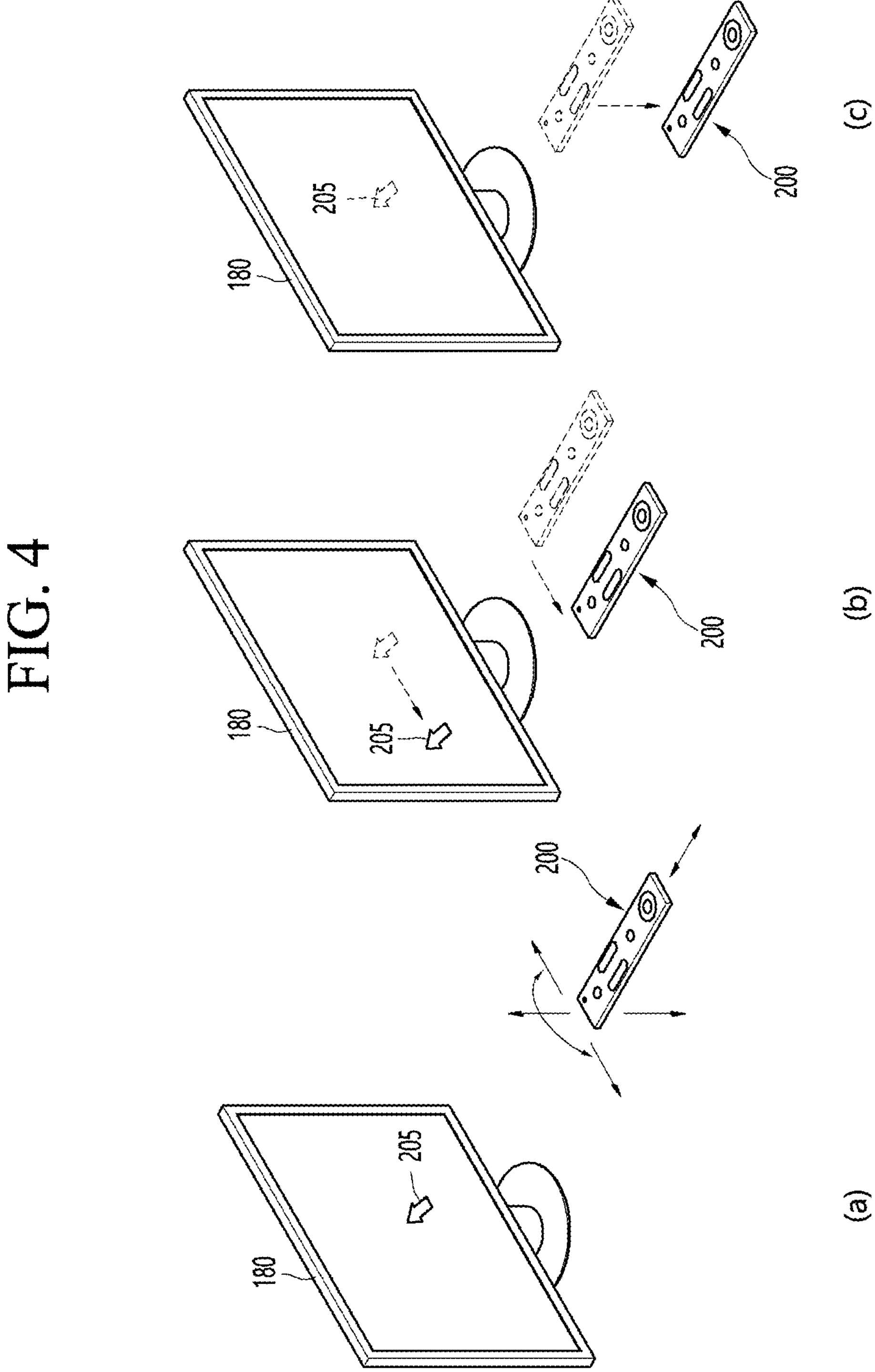
FIG. 4 shows an example of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, the display device 100 may have a shape in which the display 180 is selectively opened. According to one embodiment, the display device 100 may be formed with a door (400, see FIG. 5) that opens to open the display 180 and closes to cover the display 180, and will be described below with reference to the drawings.

Figure 5:
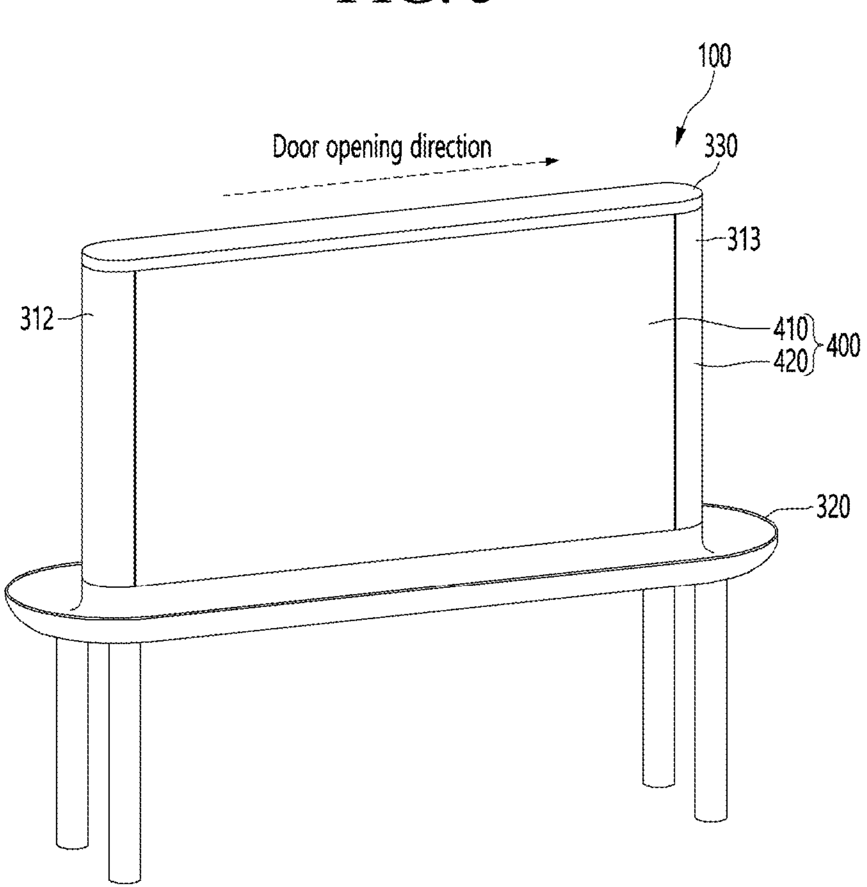
FIG. 5 is a diagram illustrating the door of a display device closed according to an embodiment of the present disclosure.
Figure 6:
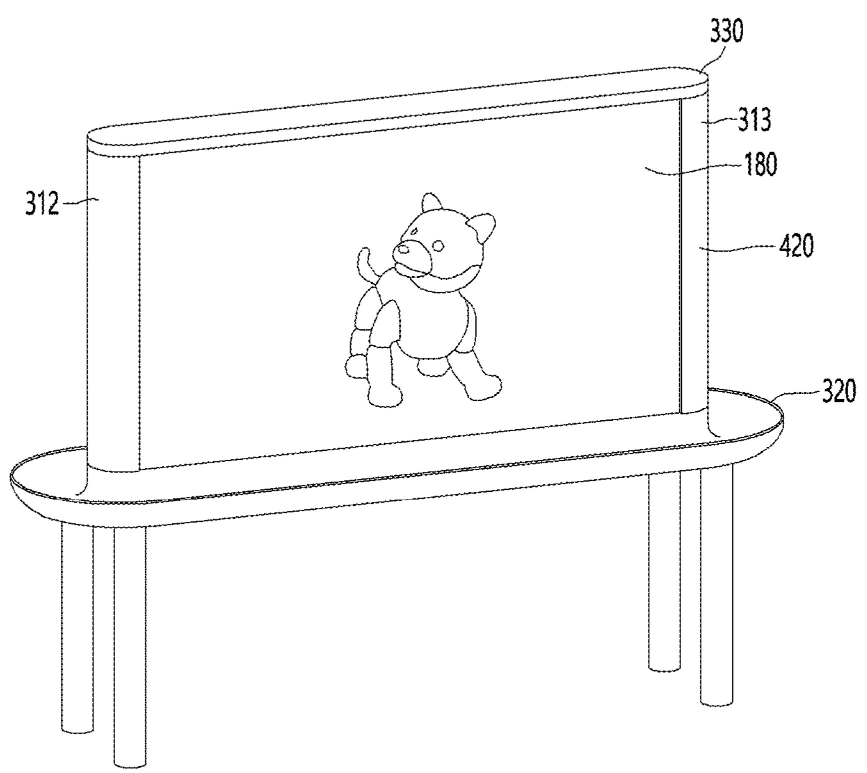
FIG. 6 is a diagram illustrating the door of a display device opened according to an embodiment of the present disclosure.
Figure 7:
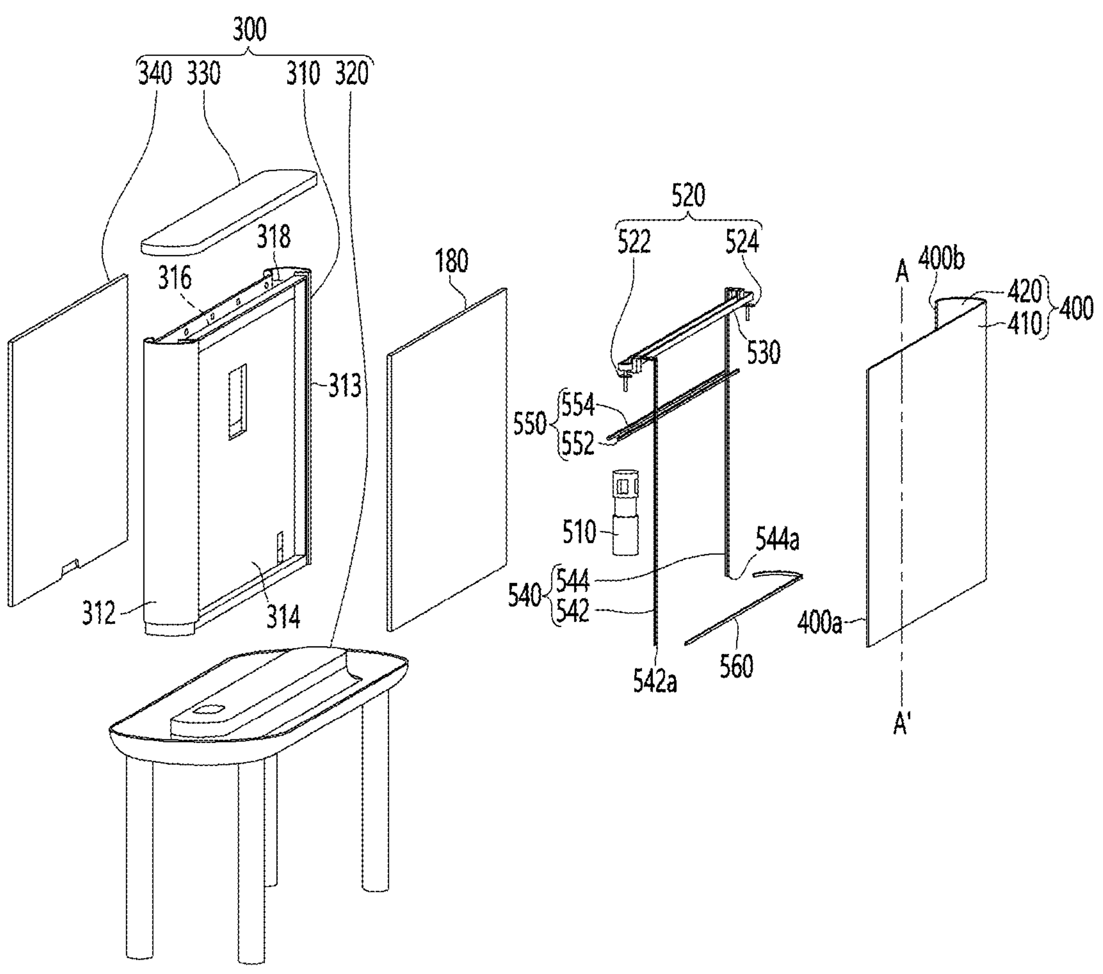
FIG. 7 is a drawing showing an exploded view of a display device according to an embodiment of the present disclosure.

FIG. 5 is a drawing illustrating a closed state of a door of a display device according to an embodiment of the present disclosure, FIG. 6 is a drawing illustrating an open state of a door of a display device according to an embodiment of the present disclosure, and FIG. 7 is a drawing illustrating an exploded view of a display device according to an embodiment of the present disclosure.

The display device 100 may include a frame 300, a display 180 fixed to the frame 300, a door 400 covering the display 180, and a sliding module for opening and closing the door 400.

The frame 300 may include a main frame 310 on which a display 180 and a sliding module are mounted, a stand 320 that supports the main frame 310, an upper cover 330 that covers the upper part of the main frame 310, and a back cover 340 that covers the back side 316 of the main frame 310.

A display 180 may be installed on a front side 314 of the main frame 310. The door 400 may cover the display 180 when a closed state, as illustrated in FIG. 5.

The door 400 may open the display 180 when opened. The door 400 may open the display 180 while moving in a door opening direction illustrated in FIG. 5. The door 400 may move between the back side 316 of the main frame 310 and the back cover 340 as it moves in the door opening direction. That is, when the door 400 is in the open state as illustrated in FIG. 6, most of the door 400 may be located between the back side 316 and the back cover 340.

The door 400 may be formed by a flat part 410 that overlaps the display 180 in a horizontal direction and a curved part 420 extending from the flat part 410 and at least a portion of that is curved. The area of the flat part 410 may vary depending on the state of the door 400. When the door 400 is in a closed state, the area of the flat part 410 may be maximum, and when the door 400 is in a fully open state, the area of the flat part 410 may be minimum (e.g., 0). The area of the curved part 420 may be the same regardless of the state of the door 400.

The first side 312 of the main frame 310 may be covered with a cover made of the same material as the door 400. The cover covering the first side 312 may be fixed. The second side 313 of the main frame 310 is opposite to the first side 312 and can be covered by the door 400. The door 400 can move along the second side 313. The curved part 420 of the door 400 can be located on the second side 313.

An installation space 318 in which the sliding module is installed may be formed in the main frame 310. The installation space 318 may be formed on an inner side of the upper part, first and second sides 312 313 of the main frame 310. The sliding module may be covered and protected by the upper cover 330 and first and second sides 312 313.

The sliding module may include at least some or all of a motor 510, a pulley 520 that receives driving force from the motor 510, a belt 530 that moves by the rotation of the pulley 520, and a door fixing bar 540 that moves in a straight-line along the belt 530. The door fixing bar 540 may be attached to the door 400 and open and close the door 400 through a straight-line movement.

In addition, the sliding module may further include at least one of a linear motion guide 550 that guides the straight-line movement of the door fixing bar 540 and a wire 560 that minimizes the shaking of the door 400.

The outer surface of the door 400 may be formed of a fabric material. Alternatively, the outer surface of the door 400 may be formed of a leather material. That is, the outer surface of the door 400 may be formed of a soft cloth material, and accordingly, when the door 400 is opened, at least a part of the door 400 may be hidden between the back side 316 and the back cover 340, so that the increase in the volume of the display device 100 due to the opening and closing of the door 400 is minimized, and there is an advantage that a neat and simple appearance is formed. In addition, when the outer surface of the door 400 is formed of a fabric material or a leather material, there is the advantage of being formed of a luxurious appearance.

Figure 8:
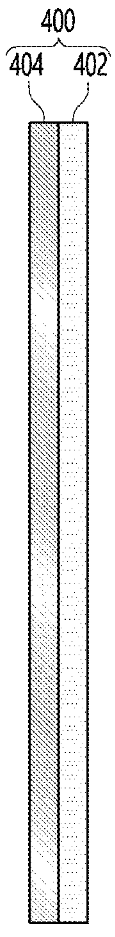
FIG. 8 is a cross-sectional view of the door taken along line A-A' of FIG. 7.

Meanwhile, if the door 400 is formed only of a cloth material, problems such as stretching due to the characteristics of the cloth material or increased friction when opening and closing may occur. Accordingly, the door 400 may be formed of a composite material that combines plastic and cloth materials. Referring to FIG. 8, a structure of a door according to an embodiment of the present disclosure will be described.

FIG. 8 is a cross-sectional view taken along line A-A' of the door illustrated in FIG. 7.

The door 400 may include a fabric sheet 402 and a plastic sheet 404. The fabric sheet 402 may form an outer surface of the door 400. The fabric sheet 402 may cover the plastic sheet 404.

The plastic sheet 404 may be attached to an inner surface of the fabric sheet 402. The plastic sheet 404 may form an inner surface of the door 400. The plastic sheet 404 may face the display 180.

In this way, when the door 400 is formed of the fabric sheet 402 and the plastic sheet 404, the problem of the fabric sheet 402 stretching or shaking is minimized, and the frictional force is reduced when the door 400 moves, so there is an advantage of improved reliability.

Next, with reference to FIGS. 9 to 12, a method of opening and closing a door by a sliding module in a display device 100 according to an embodiment of the present disclosure will be described.

Figure 9:
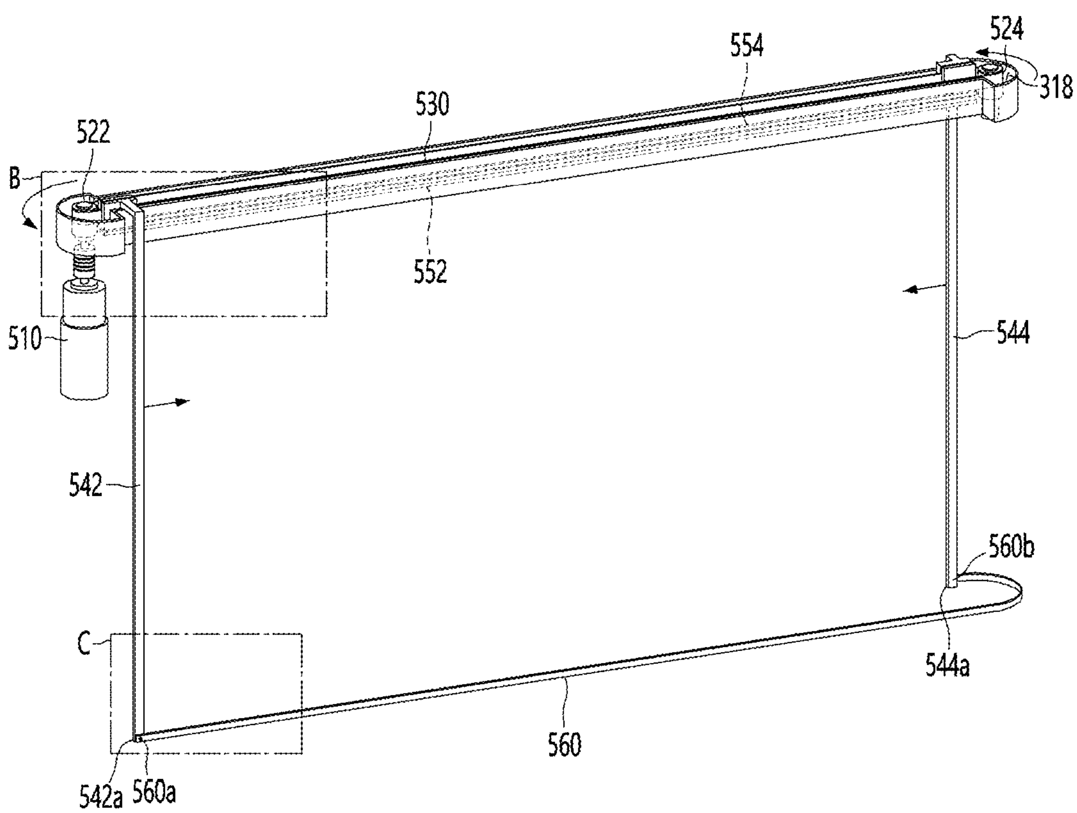
FIG. 9 is a drawing showing an installation of a sliding module of a display device according to an embodiment of the present disclosure.
Figure 10:
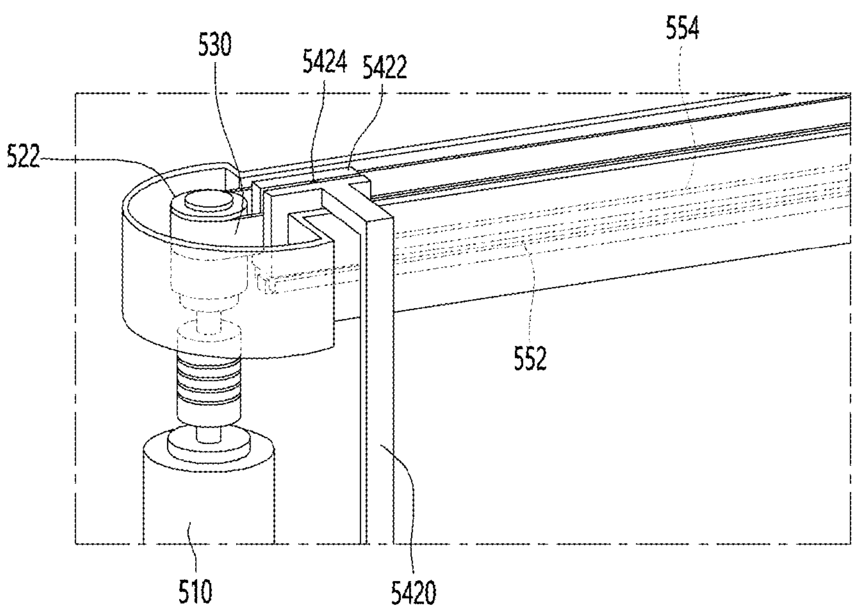
FIG. 10 is an enlarged drawing of B of FIG. 9.
Figure 11:
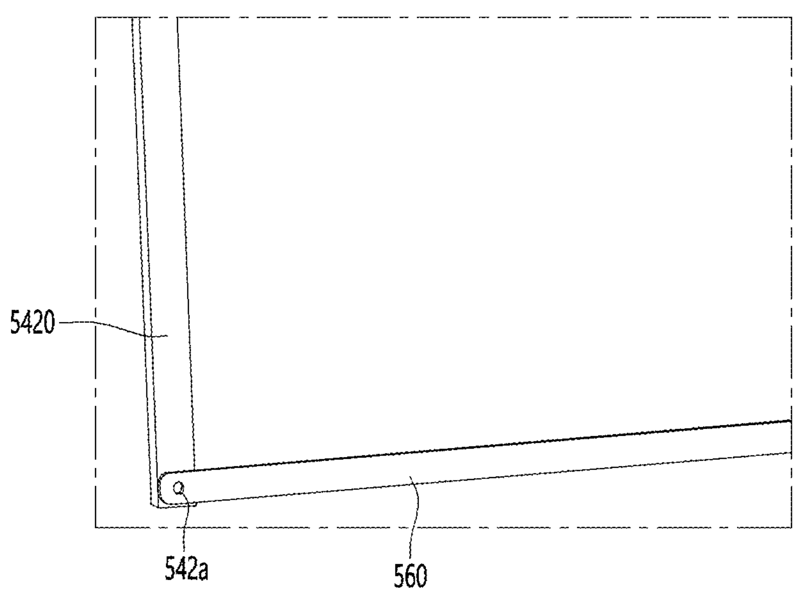
FIG. 11 is an enlarged drawing of C of FIG. 9.
Figure 12:
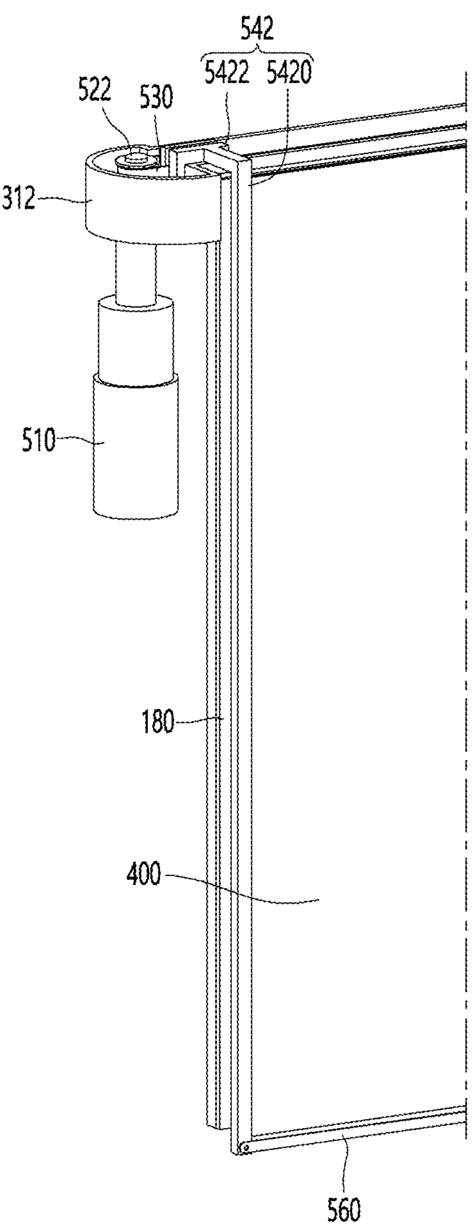
FIG. 12 is an enlarged drawing showing a door mounted on a sliding module illustrated in FIG. 9.

FIG. 9 is a drawing showing an installation appearance of a sliding module of a display device according to an embodiment of the present disclosure, FIG. 10 is an enlarged drawing of B in FIG. 9, FIG. 11 is an enlarged drawing of C in FIG. 9, and FIG. 12 is an enlarged drawing showing a door mounted on the sliding module illustrated in FIG. 9.

The sliding module can be placed in the installation space 318 formed in the main frame 310.

The belt 530 for moving the door 400 is placed in the installation space 318, and the belt 530 can be connected to the pulley 522. That is, the belt 530 is connected to the pulley 522, and the belt 530 can move by the rotation of the pulley 522.

The pulley 522 is connected to the motor 510, and can rotate by the drive of the motor 510. That is, the motor 510 rotates the pulley 522, and as the pulley 522 rotates, the belt 530 can move in a straight line.

The belt 530 can be a timing belt. The door fixing bars 542 544 can be connected to the belt 530. As the belt 530 moves, the positions of the door fixing bars 542 544 caught on the belt 530 may change.

The belt 530 may catch the first and second door fixing bars 542 544, but the number of door fixing bars may change.

As illustrated in FIG. 9, the first door fixing bar 542 may be installed in the front direction where the display 180 is placed, and the second door fixing bar 544 may be installed in the rear direction where the back cover 340 is installed. The first door fixing bar 542 may guide the door 400 located in the front direction, and the second door fixing bar 544 may guide the door 400 located in the rear direction. The first door fixing bar 542 can be attached to the first side end (400*a*, see FIG. 7) of the door 400, and the second door fixing bar 544 can be attached to the second side end (400*b*, see FIG. 7) of the door 400.

The door fixing bar 542 is attached to both side ends 400*a* 400*b* of the door 400, and can make the entire surface of the door 400 made of fabric material even.

Referring to FIG. 10, the door fixing bars 542 544 can be formed by a door connector 5420 to which the door 400 is attached, and a mounting part 5422 that extends from the door connector 5420 and is hung on the belt 530.

The door 400 is attached to the door connector 5420, and thus the door 400 can be fixed. A groove 5424 into which the belt 530 is fitted can be formed in the mounting part 5422. The belt 530 can be placed in the groove 5424, and when the belt 530 moves, the door fixing bars 542 544 can also move together. That is, when the belt 530 moves in a straight line, the door fixing bars 542 544 can move in a straight line along the belt 530.

The sliding module can further include motion guides 552 554 that guides the movement of the door fixing bars 542 544 so that the door fixing bars 542 544 can move in a straight line more stably.

The motion guides 552 554 can be linear motion guides that guides the straight-line movement of the door fixing bars 542 544. The motion guides 552 554 can be installed under the mounting part 5422. That is, the linear motion guides 552 554 is installed in a form that contacts the lower surface of the mounting part 5422, supports the mounting part 5422, and can move straight-line along the rail. The motion guides 552 554 can minimize the movement of the door fixing bars 542 544. In addition, the motion guides 552 554 can minimize the operating frictional force of the door fixing bars 542 544, thereby improving the reliability of the operation.

The motion guides 552 554 may include a first motion guide 552 positioned in the front direction and a second motion guide 554 positioned in the rear direction. The first motion guide 552 may guide the straight-line movement of the first door fixing bar 542, and the second motion guide 554 may guide the straight-line movement of the second door fixing bar 544.

Meanwhile, since the belt 530 and the motion guides 552 554 for moving and guiding the door 400 are only fastened to the upper side of the door fixing bars 542 544, there is a possibility that the lower side of the door fixing bars 542 544 may tilt or shake. Therefore, the sliding module may further include a wire 560 to secure the stability of the operation of the lower side of the door fixing bars 542 544.

The wire 560 can minimize the problem of the lower side of the door fixing bars 542 544 tilting or shaking. The wire 560 can be connected to the lower ends 542*a* 544*a* of the door fixing bars 542 544. For example, the wire 560 can have both ends 560*a* 560*b* fastened to the lower ends 542*a* 544*a* of the first door fixing bar 542 and the second door fixing bar 544, respectively. For example, the wire 560 can be fastened to the door fixing bars 542 544 using a bolt and a nut, etc., but such fastening means are only examples and are not limited thereto. As another example, as illustrated in FIG. 11, a hole is formed at each end of the wire 560, and the wire 560 may be fastened to the door fixing bars 542 544 in such a way that a protrusion formed at the lower ends 542*a* 544*a* of the door fixing bars 542 544 is fitted into the hole.

As shown in FIG. 12, the flat part 410 of the door 400 can cover the display 180. The curved part 420 can be extended from the flat part 410 and formed in a curved shape at least in part.

Through this, the present disclosure can provide a display device 100 to which a soft material door 400 is applied, and thus has an advantage of an interior improvement effect.

In addition, the display device 100 described above can further include at least one hall sensor 702. For example, the hall sensor can be installed in the frame 300, but the location of the hall sensor is only exemplary.

The controller 170 can control the sliding module so that the door 400 automatically opens and closes based on the sensing of the hall sensor. Alternatively, the controller 170 may control the display 180 to output various videos based on the sensing of the hall sensor.

Next, with reference to FIGS. 13 to 16, a hall sensor installed in a display device 100 according to an embodiment of the present disclosure will be described.

Figure 13:
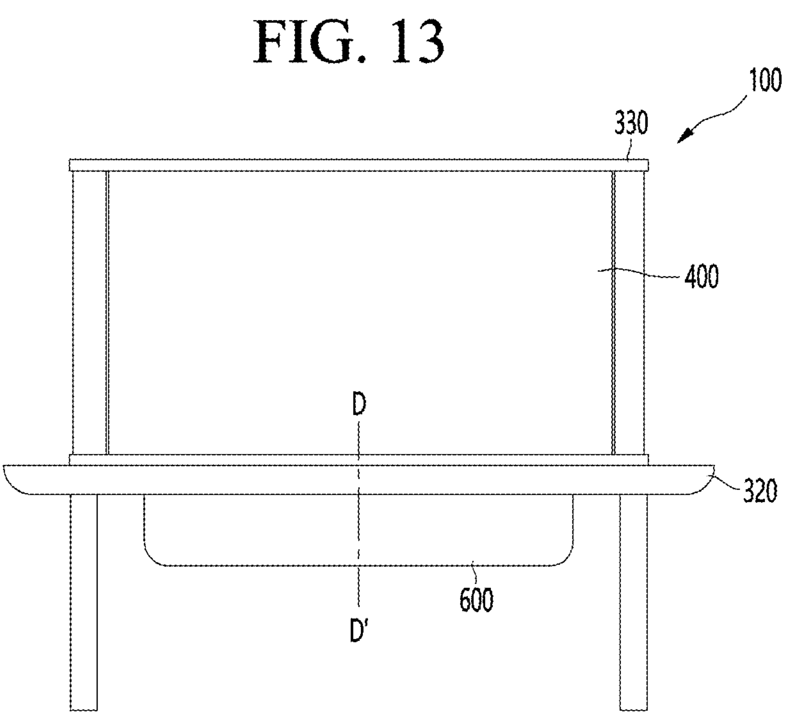
FIG. 13 is an exemplary drawing showing a magnetic plate mounted on a display device having a hall sensor according to an embodiment of the present disclosure.
Figure 14:
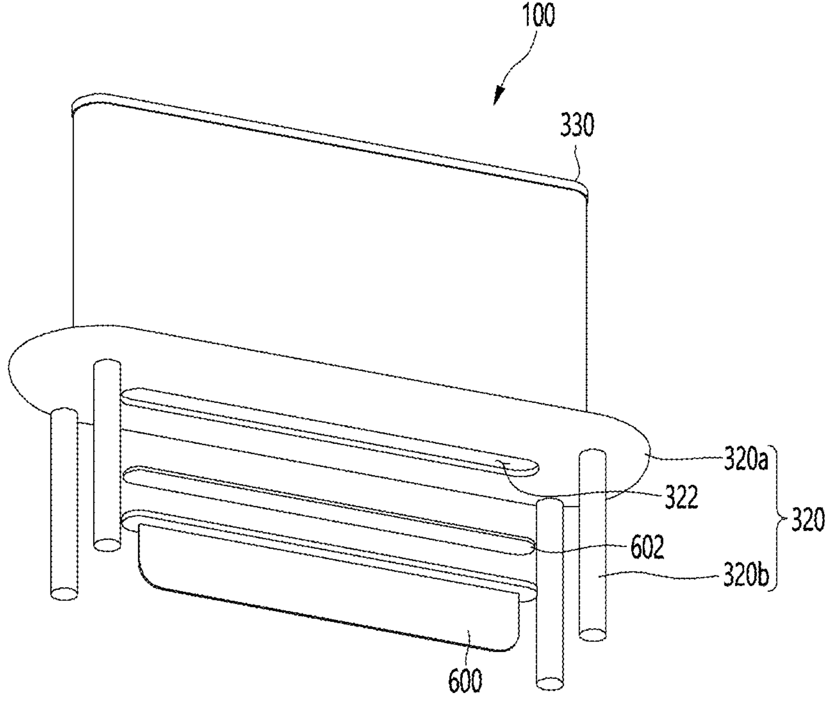
FIG. 14 is an exemplary drawing showing a magnetic plate separated from FIG. 13.
Figure 15:
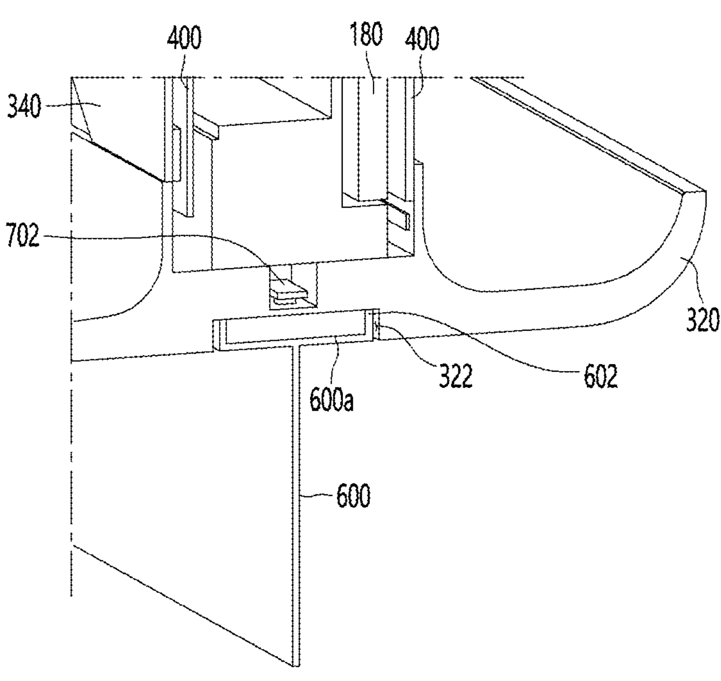
FIG. 15 is an exemplary drawing showing a D-D' cross-section in FIG. 13.
Figure 16:
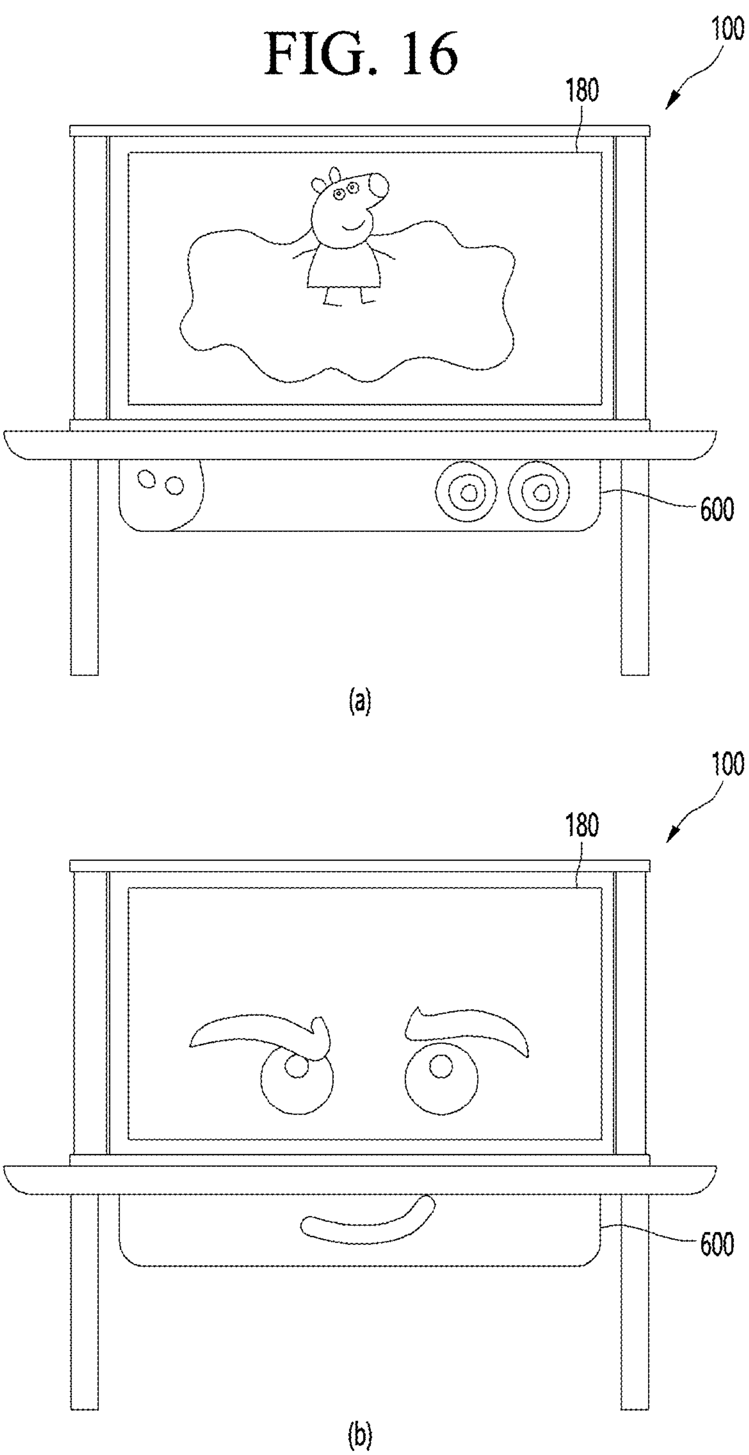
FIG. 16 is an exemplary drawing showing a display device according to an embodiment of the present disclosure outputting a video based on a magnetic plate.

FIG. 13 is an exemplary drawing illustrating a magnetic plate mounted on a display device having a hall sensor according to an embodiment of the present disclosure, FIG. 14 is an exemplary drawing illustrating a magnetic plate separated from FIG. 13, FIG. 15 is an exemplary drawing illustrating a D-D' cross-section of FIG. 13, and FIG. 16 is an exemplary drawing illustrating a display device according to an embodiment of the present disclosure outputting an video based on a magnetic plate.

The display device 100 may further include at least one hall sensor (702, see FIG. 15) and a magnetic plate 600 that may be sensed by the hall sensor 702.

The magnetic plate 600 may be detachably attached to the display device 100. For example, the magnetic plate 600 may be attached to the stand 320, but this is merely an example and is not limited thereto.

As illustrated in FIG. 14, a magnetic space 322 to which the magnetic plate 600 may be attached may be formed in the stand 320. The stand 320 may be formed by a pedestal 320*a* that supports the main frame 310 and a leg 320*b* that supports the pedestal 320*a*. The magnetic space 322 may be formed on the lower surface of the pedestal 320*a*.

The magnetic plate 600 may include a magnetic material 602. As illustrated in FIG. 15, an accommodation space 600*a* is formed on the upper portion of the magnetic plate 600, and the magnetic material 602 may be arranged in the accommodation space 600*a*. The hall sensor 702 may be arranged close to the pedestal 320*a*, particularly, the magnetic space 322. Referring to the example of FIG. 15, the hall sensor 702 may be arranged directly above the magnetic space 322. Therefore, when the magnetic plate 600 is attached to the magnetic space 322, the hall sensor 702 can sense the magnetic force of the magnetic material 602 included in the magnetic plate 600.

Meanwhile, the type of the magnetic plate 600 may vary, and the magnetic field size of the magnetic material 602 may differ depending on the type of the magnetic plate 600. For example, the magnetic field size of the magnetic material 602 included in the magnetic plate 600 illustrated in (a) of FIG. 16 may be a first size, and the magnetic field size of the magnetic material 602 included in the magnetic plate 600 illustrated in (b) of FIG. 16 may be a second size. Accordingly, the hall sensor 702 may sense the magnetic field size as the first size when the magnetic plate 600 illustrated in (a) of FIG. 16 is attached, and may sense the magnetic field size as the second size when the magnetic plate 600 illustrated in (b) of FIG. 16 is attached. The controller 170 may output different videos depending on the magnetic field size detected by the hall sensor 702. For example, the controller 170 can control the display 180 to output a first video when the magnetic field size sensed by the hall sensor 702 is the first size, and to output a second video when the magnetic field size sensed by the hall sensor 702 is the second size. That is, the controller 170 can preset the magnetic field size and the video to be output, and can output the video based on the magnetic field size sensed by the hall sensor 702.

Accordingly, the display device 100 has the advantage of being linked to the magnetic plate 600 and being able to output the video accordingly.

In addition, the display device 100 according to the embodiment of the present disclosure can automatically open and close the door 400.

The door 400 can be automatically opened and closed depending on whether a user is present in front. For example, the door 400 can be opened when a user is present in front, and closed when a user is not present in front. The door 400 can be closed if no user is present in front of the display device for a preset period of time (e.g. 30 minutes).

In addition, the door 400 may be opened in whole or in part depending on the distance from the user. For example, if the distance from the user is greater than a preset distance (e.g., 2 m), the door 400 may be opened in whole, and if the distance from the user is less than the preset distance, the door 400 may be opened in part. Through this, there is an advantage in that a user (e.g., a child) can be warned through the degree of door opening when he or she tries to watch a video from too close.

Figure 17:
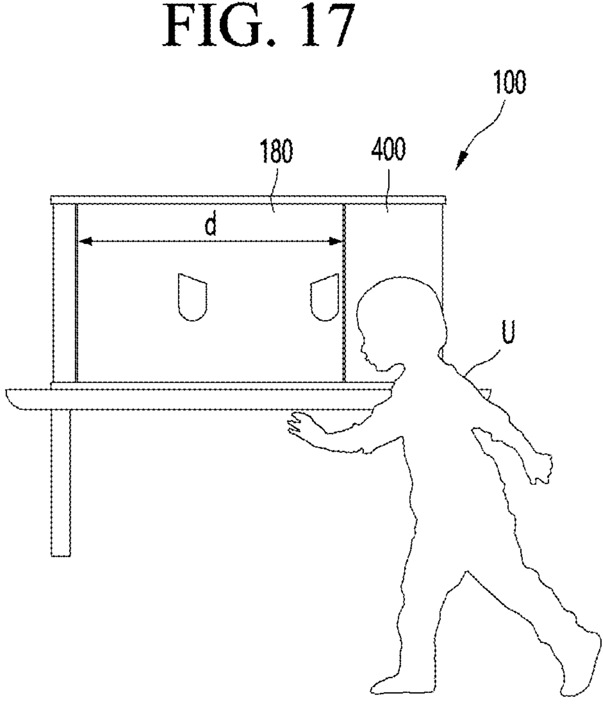
FIGS. 17 to 18 are drawings showing a display device according to an embodiment of the present disclosure opening a door based on a distance from a user.
Figure 18:
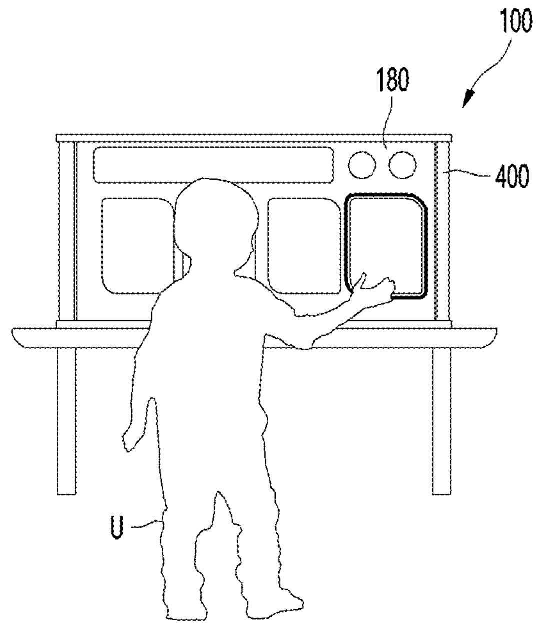

FIGS. 17 and 18 are drawings illustrating a display device according to an embodiment of the present disclosure opening a door based on the distance from the user.

For example, a passive infrared sensor (PIR sensor) or an ultrasonic sensor may be placed on stand 320. The controller 170 may obtain the presence of the user or obtain the distance from the user by using at least one of the PIR sensor or the ultrasonic sensor.

The controller 170 can set the open stage of the door 400 based on the distance from the user (U). For example, the controller 170 can set the open stage of the door 400 to the first stage if the distance from the user (U) is greater than or equal to a first distance, set the open stage of the door 400 to the second stage if the distance from the user (U) is less than the first distance and greater than or equal to a second distance, and set the open stage of the door 400 to the third stage if the distance from the user (U) is less than the second distance. The first stage can be a stage in which the door 400 is fully opened, the second stage can be a stage in which the door 400 is partially opened, and the second stage can be a stage in which the door 400 is fully closed.

As another example, the controller 170 can increase the open length (d) of the door 400 in proportion to the distance from the user (U). Then, the controller 170 can output a video in a part of the area depending on the open length (d) of the door 400. In other words, the controller 170 can output the video only in the open area of the display 180 depending on the open length (d) of the door 400.

Meanwhile, the controller 170 can output the video only in the area exposed to the outside among the entire area of the display 180 based on the open length (d) when the door 400 is only partially opened. Through this, the controller 170 can also physically divide the screen to implement various screens.

Meanwhile, the display 180 can be implemented as a touch screen capable of touch input, and in this case, as illustrated in FIG. 18, even if the distance from the user (U) is close, the door 400 can be fully opened.

Figure 19:
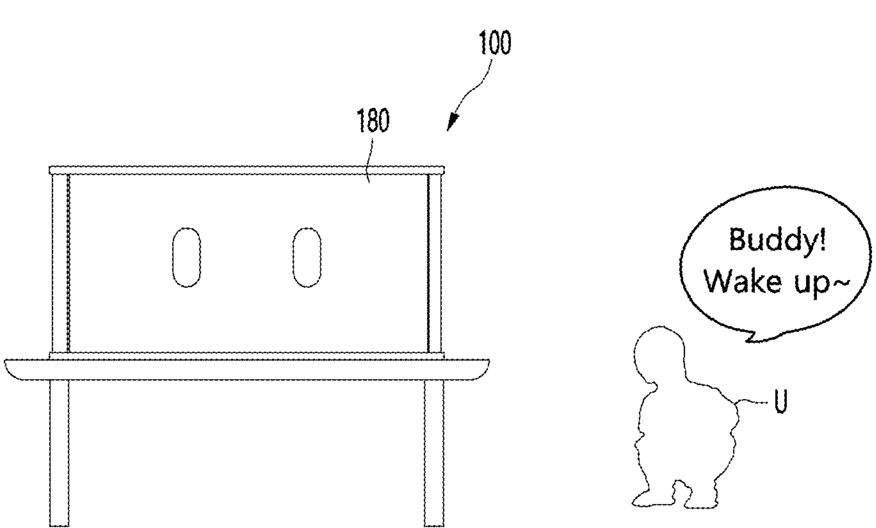
FIG. 19 is an exemplary drawing showing a display device according to an embodiment of the present disclosure opening a door according to a voice command.

FIG. 19 is an exemplary drawing showing a display device according to an embodiment of the present disclosure opening a door according to a voice command.

The controller 170 can receive a voice command from a user (U) through a microphone 175. The controller 170 can turn off the door 400 when receiving a voice command to turn on the display device 100. In addition, the controller 170 can output a video such as blinking eyes while opening the door 400.

Figure 20:
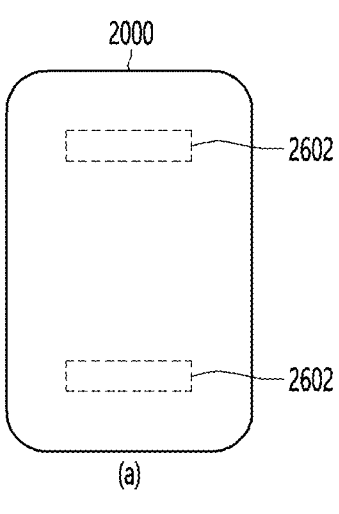
FIG. 20 is a drawing for explaining a remote control device transmitting a wireless signal to a display device and a case covering the same according to an embodiment of the present disclosure.
Figure 20:
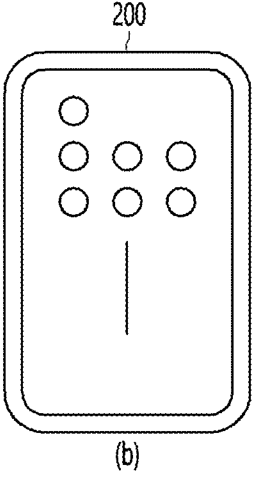
Figure 20:
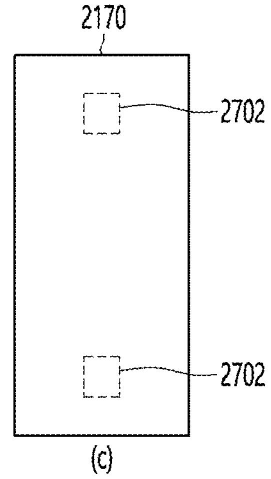

FIG. 20 is a drawing for explaining a remote control device transmitting a wireless signal to a display device and a case covering the same according to an embodiment of the present disclosure.

A display system according to an embodiment of the present disclosure may include the above-described display device 100 and a remote control device 200 that transmits a wireless signal to the display device 100.

The remote control device 200 may include at least one hall sensor 270. And, the remote control device 200 may be covered with a case 2000, and the case 2000 may include at least one magnetic material 2602.

That is, (a) of FIG. 20 may represent the case 200, (b) of FIG. 20 may represent the remote control device 200, and (c) of FIG. 20 may be a PCB 2170 provided inside the remote control device 200.

The case 2000 is provided with at least one magnetic material 2602, and the PCB 2170 may be provided with a hall sensor 2702. The hall sensor 2702 may be placed at a position corresponding to the position of the magnetic material 2602 when the case 2000 covers the remote control device 200. In addition, the magnetic field strength and direction of the magnetic material 2602 provided in the case 2000 may be different depending on the type of the case 2000.

Therefore, the remote control device 200 may recognize the type of the case 2000 based on the magnetic field strength and direction recognized by the hall sensor 2702 when the case 2000 is covered. The remote control device 200 transmits information about the type of the recognized case 2000 to the display device 100, and the controller 170 of the display device 100 can output different videos depending on the type of the case 2000.

According to one embodiment of the present invention, the above-described method can be implemented as a code that can be read by a processor on a medium in which a program is recorded. Examples of the medium that can be read by a processor include a ROM, a RAM, a CD-ROM, a magnetic tape, a floppy disk, an optical data storage device, etc.

The display device described above is not limited to the configuration and method of the embodiments described above, and the embodiments can be configured by selectively combining all or part of each embodiment so that various modifications can be made.

The invention claimed is:

1. A display device, comprising:
a frame;
a display fixed to the frame;
a door covering the display; and
a sliding module for opening and closing the door,
wherein the door is formed of a plastic sheet and a fabric sheet covering the plastic sheet,
wherein the sliding module comprises:
a motor,
a pulley that rotates by driving the motor,
a belt that moves by rotation of the pulley, and
at least one door fixing bar that is attached to the door and moves linearly along the belt,
wherein the at least one door fixing bar comprises:
a first door fixing bar attached to a first side end of the door, and
a second door fixing bar attached to a second side end of the door, and
wherein the display device further comprises a wire whose two ends are connected to lower ends of the first door fixing bar and the second door fixing bar, respectively.

2. The display device of claim 1, wherein the sliding module further comprises a linear motion guide that guides straight-line movement of the at least one door fixing bar.

3. The display device of claim 1, wherein the door is formed by a flat part covering the display, and a curved part extending from the flat part and having at least a portion of a curve.

4. The display device of claim 1, further comprising at least one hall sensor installed in the frame.

5. The display device of claim 4, wherein the display is configured to output different videos depending on a size of a magnetic field detected by the hall sensor.

6. The display device of claim 4, further comprising a magnetic plate that is detachable and recognized by the hall sensor.

7. The display device of claim 1, wherein the door is configured to open or close automatically depending on whether a user is in front of the door or not.

8. The display device of claim 7, wherein the door is fully or partially open depending on a distance from the user.

9. The display device of claim 1, wherein the display is configured to output video in one area according to an open length of the door.

10. The display device of claim 1, wherein the frame comprises:

a main frame on which the display and the sliding module are mounted, an upper cover covering an upper portion of the main frame, and a stand supporting the main frame.

11. A display system including a display device and a remote control device that transmits a wireless signal to the display device, wherein the display device comprises:

a frame;

a display fixed to the frame;

a door covering the display; and a sliding module for opening and closing the door, and wherein the door is formed of a plastic sheet and a fabric sheet covering the plastic sheet, wherein the sliding module comprises:

a motor, a pulley that rotates by driving the motor, a belt that moves by rotation of the pulley, and at least one door fixing bar that is attached to the door and moves linearly along the belt, wherein the at least one door fixing bar comprises:

a first door fixing bar attached to a first side end of the door, and a second door fixing bar attached to a second side end of the door, and wherein the display device further comprises a wire whose two ends are connected to lower ends of the first door fixing bar and the second door fixing bar, respectively.

12. The display system of claim 11, wherein the remote control device comprises at least one hall sensor.

* * * * *